United States Patent [19]

Wolf et al.

[11] Patent Number: 4,807,857

[45] Date of Patent: Feb. 28, 1989

[54] SOFT MOUNTING FOR INSULATING BODY-TRANSMITTED ACOUSTIC WAVES

[75] Inventors: Franz J. Wolf; Hubert Pletsch, both of Bad Soden-Salmunster; Otto Weber; Volkamr Keck, both of Wolfsburg, all of Fed. Rep. of Germany

[73] Assignees: WOCO Franz-Josef Wolf & Co.; Volkswagen AG, Fed. Rep. of Germany

[21] Appl. No.: 100,458

[22] Filed: Sep. 24, 1987

[30] Foreign Application Priority Data

Oct. 28, 1986 [DE] Fed. Rep. of Germany ....... 3636674

[51] Int. Cl.⁴ .......................... B60K 5/12; F16F 3/08
[52] U.S. Cl. ................... 267/140.3; 248/636; 267/140.5; 267/141.1; 267/141.6; 267/153; 267/141.2
[58] Field of Search .......... 267/140.1–141.7, 267/152, 153, 219–220, 292–294, 35; 180/300, 312; 248/636, 562, 565, 621, 632, 634, 635; 181/207

[56] References Cited

U.S. PATENT DOCUMENTS

| | | | |
|---|---|---|---|
| 2,597,878 | 5/1952 | Lee | 267/140.3 |
| 2,724,588 | 11/1955 | Sheets | 267/35 |
| 2,880,885 | 4/1959 | Willison | 267/141.1 X |
| 3,575,403 | 4/1971 | Hamel et al. | 267/152 X |
| 4,348,015 | 9/1982 | Domer | 267/140.4 |
| 4,378,936 | 4/1983 | Brenner | 267/140.2 X |
| 4,383,679 | 5/1983 | Kakimoto | 267/153 X |
| 4,416,445 | 11/1983 | Coad | 267/140.1 X |
| 4,418,898 | 12/1983 | Atsumi et al. | 267/141.1 X |
| 4,428,569 | 1/1984 | Takei | 267/140.1 X |
| 4,660,813 | 4/1987 | Reuter | 267/140.1 |
| 4,681,304 | 7/1987 | Hassan | 267/153 X |

FOREIGN PATENT DOCUMENTS

| | | |
|---|---|---|
| 1791052 | 4/1959 | Fed. Rep. of Germany . |
| 2319957 | 11/1974 | Fed. Rep. of Germany ...... 267/141 |
| 3238924 | 4/1984 | Fed. Rep. of Germany . |
| 3306793 | 8/1984 | Fed. Rep. of Germany ...... 267/153 |
| 3438167 | 4/1986 | Fed. Rep. of Germany ...... 267/152 |
| 3506977 | 8/1986 | Fed. Rep. of Germany . |

*Primary Examiner*—Douglas C. Butler
*Attorney, Agent, or Firm*—Burns, Doane, Swecker & Mathis

[57] ABSTRACT

A soft mounting for insulating body transmitted waves comprises a soft support spring block made of elastic material. The support spring block is disposed between two beaker-type housing parts which serve to transfer load forces into the support spring block. The housing parts are arranged coaxially with respect to one another and are telescopically positioned within one another. Elastomer spring elements having cavities located therein concentrically surround the support spring block. The cavities serve to show the effect of a collapse of a spring restoration force by kinking.

15 Claims, 1 Drawing Sheet

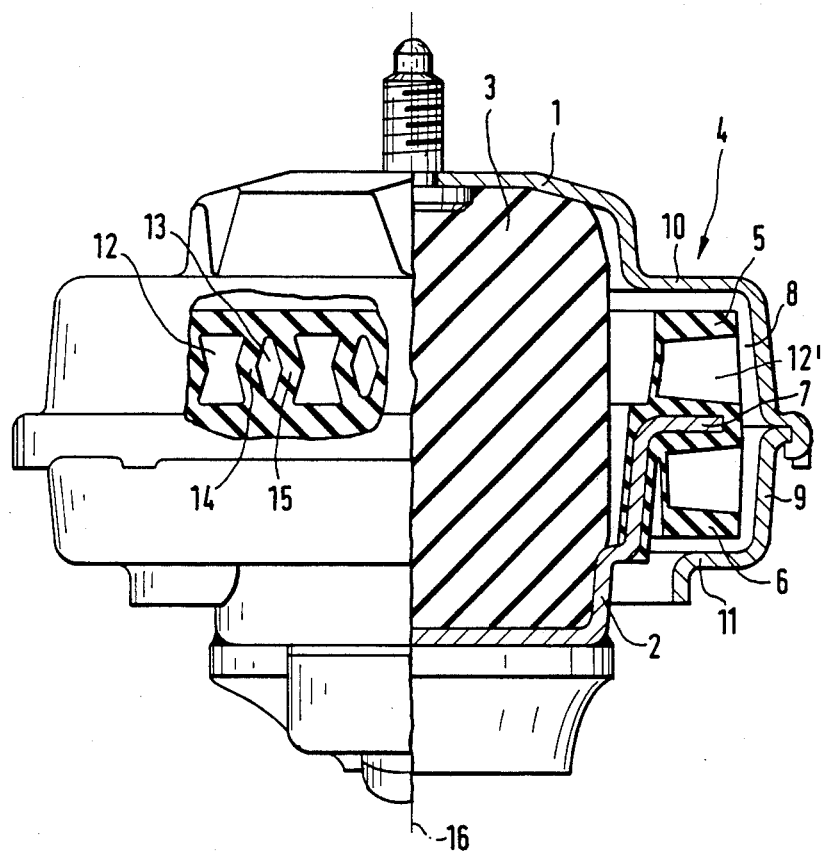

SOFT MOUNTING FOR INSULATING BODY-TRANSMITTED ACOUSTIC WAVES

DESCRIPTION

The invention relates to a soft mounting for insulating body-transmitted waves, in particular for mounting an internal combustion engine. The mounting comprising a soft support spring block made of an elastic material and disposed inbetween two beaker-type housing parts which also serve for transferring load forces into the support spring block. The housing parts are arranged coaxially with respect to each other and telescopically are inserted into one another in a radially spaced and axially mutually restrictive relationship so as to form a means for restricting and limiting the deflection paths of the support spring block through the presence of ancillary elastomer stoppers.

BACKGROUND OF THE INVENTION

One type of mounting is known from the German patent application No. De. 35 06 977 A1 published on Aug. 28, 1986. The known mounting provides an excellent insulating behaviour with respect to body-transmitted waves, which means a good accoustic decoupling of the two beaker-type housing parts serving for transferring load forces, and a desirably soft linear spring characteristic curve. However, in obtaining those advantages, the disadvantage of a relatively narrow usable work range must be accepted. It is true that the usable work range can be enlarged constructively without any problems by providing a larger distance between the elastomer end stop means, but this would lead to the fact, especially when having low-frequency vibrations in the range of about 10 to 20 Hz or below with large amplitudes, that the load to be supported elastically, for example an internal combustion engine of a motor vehicle, would be transferred to the elastomer stoppers of the means for restricting and limiting the deflection path with such an acceleration that the spring characteristic curve of the mounting, would not correspond any more to the object of a support spring. Therefore, the narrow usable range of the support spring, which relates to the relatively narrow limitation of the linear work range of the soft support spring, is the disadvantage which must be accepted.

SUMMARY AND OBJECTS OF THE INVENTION

Based on this state of the art, one object of the present invention is to develop a soft mounting for insulating body-transmitted waves of the type named above so that the soft linear range of the spring characteristic curve, which can be used for solving the object of a dynamic support spring, can be enlarged significantly without accepting an undesirably large amplitude of the range of the spring with all the disadvantages related therewith.

The invention solves this problem by a soft mounting for insulating body-transmitted waves of the type named above, especially used in motor vehicle construction for supporting an internal combustion engine, which comprises the features hereinafter described.

The essential idea of the present invention is to replace in a mounting according to the state of the art the passive elastomer end stop means of the means for restricting and limiting the deflection path, which shows a continuously progressive characteristic curve, by an active elastomer spring element which does not only limit the work range of the characteristic curve of the support spring, but also modifies the work range characteristics. This active elastomer spring element is an elastomer spring element which is designed to bear a compression force and which is designed with respect to its geometrical shape so that the elastomer material, which is deformed by the load, does not only react to the load acting thereon by an elastic restoration force, but shows the effect of a collapse of the spring restoration force by kinking. This means that the spring rate of such an elastomer spring element is decreasing immediately from a certain value dependent from the work range to a zero point when having reached the critical load for the kinking effect. The characteristic curve of the spring element and the spring rate will increase again when the collapsed elastomer spring element is compressed by a further increasing load.

The simplest form of such an elastomer spring element is, for example, a rod-type elastomer spring element loaded with an axial force which shows first of all the well-known spring characteristic curve dependent from the material of the spring element until it collapses by kinking caused by an non-homogenous behaviour of the transverse stress components when the load is increasing. A portion of a flexible tube loaded with an axial force constitutes such an elastomer spring element as defined in the present invention, too. In the case of both the rod-type cylindrically-shaped elastomer spring element and the flexible-tube-type cylindrically-shaped elastomer spring element the non-homogeneous transverse stress components and the load by which such a spring element starts collapsing. kinking are first of all determined by the initial point for kinking can be pretermined relatively exactly by the geometrical shape of the kinking area when there is no load acting on the mounting. Typical examples for such elastomer spring elements are axially loaded hollow or tubular elastomer spring elements with a more or less barrel-shaped or hour-glass-shaped configuration. It is just as important that the supporting elastomer spring material does not penetrate out of the material when there is no load acting on the mounting and that the two housing parts are connected linearly, because otherwise this would cause kinking effect of the elastomer without any usable elastical spring restoration force instead of an initial elastical restoration force. Such structures do not constitute elastomer spring elements with the effect of a collapse by kinking in the sense of the present invention.

In the known soft mounting for insulating body-transmitted waves the soft linear range of the characteristic curve of the support spring block is passed through until the end stop means of the mounting contact each other whereby the linear work range is limited by a very progressive range of the characteristic curve. In a mounting according to the present invention, however, the characteristic curve preferably shows first of all a linear work range caused only by the deformation behaviour of the soft support spring block. When the end stop means come into contact with the elastomer spring elements, the characteristic curve shows a steep surging ascent which results from the addition of the spring rate of the support spring block and of the elastomer spring element. When the elastomer spring element collapses by kinking, the characteristic curve of the mounting is determined by the characteristic curve of the soft support spring block, only. The influence of the elastomer spring element with respect to the characteristic curve cannot be seen until the elastomer material of the elastomer spring element is compressed. This leads to a progressive range which completes the characteristic curve of the mounting.

By the fact that the elastomer stoppers of the means for restricting and limiting the deflection path of the support spring block in the soft mounting for insulating body-transmitted waves are formed as elastomer spring elements showing the effect of a collapse of the spring restoration force by kinking, in a mounting according to the present invention it can be achieved by generating a step in the characteristic curve of the support spring block so that the load to be supported softly and elastically can be increased in multiples with respect to the known mounting under corresponding working conditions without changing the short range of spring. However, the practically usable range of the soft linear characteristic curve of the support spring block can be enlarged multiples without enlarging the range of spring needed constructively and effectively. In practice, the height of the step of the characteristic curve, i.e., the hardness of the elastomer spring element before starting the kinking effect, is chosen so that the portion of the load which is supported relatively inelastically in neglectably small regarding its effect on the mass of the reference system, i.e., the mass of the supporting system.

Regarding the example of supporting an internal combustion engine in a motor vehicle, this means that only the portion of the accelerated mass of the vibrating engine is supported relatively inelastically by the elastomer spring element which is small enough with respect to the inert mass of the whole vehicle that it does not accelerate the inert mass of the whole vehicle remarkably. The portion of the vibrating mass of the engine exceeding this limit determined by the requirements for comfort is supported softly and elastically by the soft support spring block of the mounting according to the present invention, so that these forces are attenuated within the support spring block without coming into contact with the chassis and the car body.

In particular, with regard to its use in motor vehicle construction, the mounting according to the present invention is preferably characterized in that one of the beaker-type housing parts comprises an external flange and the other of the beaker-type housing parts comprises an annular chamber open radially inwards into which chamber the external flange is protruding in a radially and axially spaced relationship. In this embodiment, the external flange supports on both sides, on its upper side opposite the first beaker-type housing part as well as on its lower side, the elastomer spring elements which are cooperating with the radial walls of the annular chamber acting as radial end stop means. The elastomer spring elements are preferably ring-shaped elements wherein each of the ring-shaped elastomer spring elements is interspersed with mutually parallel and, if they are opposite each other separated by the central opening of the ring-shaped elements, coaxial channels open on both sides and lying in the same radial plane, whereat the cross-sections of said channels are formed in such a way that the walls of said channels show the effect of a collapse by kinking once a load acting thereon surpasses a certain predetermined critical value. In the simplest case, the channels lying side-by-side with a relatively small distance between each other have a square-shaped or upright standing rectangular cross-section. However, for the purpose of providing an exactly predetermined initial point for kinking, the cross-sections of the channels formed in the ring-shaped elastomer spring elements are preferably alternatingly shaped like an upright standing rhomb and an upright standing double trapezoidal hexagon with its smaller basic line inside, i.e., shaped like an hour-glass but with a smaller reduction in its cross-sectional area. This embodiment of the elastomer spring element is particularly cost-effective with respect to its production, because relatively cheap form tools can be used for producing such rubber bodies.

In practice, the mounting according to the present invention is preferably pre-stressed against the direction of a predetermined load, so that the elastomer spring elements have a predetermined distance to the end stop means of the means for restricting and limiting the deflection path of the support spring block when the mounting is loaded statically with a predetermined load according to the respective application. Without said pre-stress, the mounting will show an asymmetric oscillating behaviour, which is probably not desirable in most applications.

With the foregoing and other objects, advantages and features of the invention that will become hereinafter apparent, the nature of the invention may be more clearly understood by reference to the accompanying drawing, the following detailed description of the preferred embodiment and the appended claims.

BRIEF DESCRIPTION OF THE DRAWING

The single FIGURE shows partially in side view and partially axially sectioned an embodiment of the soft mounting for insulating body-transmitted accoustic waves as used for mounting an engine of a motor vehicle.

DETAILED DESCRIPTION OF THE PREFERRED EMBODIMENT

An embodiment of the soft mounting for insulating body-transmitted waves according to the present invention is shown in the single FIGURE side view, partially broken-up and partially axially sectioned. The illustrated mounting is used for mounting the engine of a motor vehicle. A soft support spring block 3 made of rubber is inserted between two beaker-type housing parts 1,2 which serve for transferring load forces into said support spring block. The two beaker-type housing parts 1,2 are arranged coaxially with respect to each other and telescopically are inserted into one another in a radially spaced and axially mutually restrictive relationship so as to form a means 4 for restricting and limiting the deflection path of the support spring block 3 in both directions. This means that the range of spring according to the single FIGURE is limited upwards by a first elastomer spring element as well as downwards by a second elastomer spring element with respect to the amplitude of vibration. As explained below, these elastomer spring elements of the means 4 for restricting and limiting the deflection path of the support spring block are formed as elastomer spring elements 5,6 showing the effect of a collapse of the spring restoration force by kinking.

In the embodiment of the mounting shown in the single FIGURE, the second beaker-type housing part 2 supports the support spring block 3 and comprises at its upper edge an external flange 7. The first beaker-type housing part 1 serves for transferring the load and comprises an annular chamber 8 open radially inwards into which the external flange 7 of the second beaker-type housing part 2 protrudes. This means that the external flange with the elastomer spring elements 5,6 fixed thereon is formed radially-spaced with respect to the cylindrically-shaped outer wall 9 of the annular chamber 8 as well as axially-spaced with respect to the radially-extending walls 10,11 limiting the annular chamber 8 axially. The mounting shown in the single FIGURE is adjusted in such a way that, when there is no load acting on the mounting, the elastomer spring elements 5,6 do not contact the radially-extending walls 10,11. Normally, the support spring block 3 preferably will be pre-stressed so that the elastomer spring element 6 is pressed with a predetermined load to the lower radially-extending wall 11 of the annular chamber 8. This load, dependent on the special application, has the effect that, when there is acting a certain predetermined static load, for example the engine of a motor vehicle not being in movement, the mounting shows the configuration of an unloaded mounting as illustrated in the single FIGURE. By pre-stressing the support spring block 3, there will be achieved a symmetric oscillation vibration behaviour of a mounting according to the present invention.

In the embodiment shown in the single FIGURE, the support spring block 3 and the elastomer spring elements 5,6 are arranged coaxially with respect to each other, so that the elastomer spring elements 5,6 are surrounding the support spring block 3 in a circularly-closed and ring-shaped way. However, as can be seen easily, it is not principally necessary that the generally ring-shaped elastomer spring elements are circularly-closed. For some special applications, it will be even more advantageous to have the elastomer spring element segmented. But the solution of these problems is only dependent from the special application and has no effect on the principle of the present invention.

The ring-shaped elastomer spring elements are spaced a minimum radial distance with respect to the centrally and coaxially arranged support spring block so that, even when the maximum load is acting on the mounting, the inner wall of the elastomer spring elements does not come into contact with the outer wall of the support spring block. By that arrangement, a direct-contact-coupling between the two spring members, which would have a negative influence on the spring characteristic curve of the mounting, is avoided.

In the embodiment shown in the single FIGURE, each of the ring-shaped elastomer spring elements 5,6 is interspersed with mutually parallel and, if they are opposite each other separated by the central opening of the ring-shaped element, coaxial channels 12,13 open on both sides and lying in the same radial plane. The cross-sections of said channels are formed in such a way that the walls 14,15 of said channels show the effect of a collapse by kinking once a load acting thereon surpasses a certain predetermined critical value. As can be seen in the single FIGURE, this effect is achieved by that the cross-sections of the channels formed in the ring-shaped elastomer spring elements are alternatingly-shaped like an upright standing rhomb (channel 13) and an upright standing double trapezoidal hexagon (channel 12) with its smaller basic line inside. This means that the cross-section of said channel 12 corresponds essentially to the cross-section of an hour-glass, whereat the smallest part of the hexagonal profile of the channel 12 is wider than the smallest part of the cross-section of an hour-glass.

In particular, the channels 12,13 formed in the ring-shaped elastomer spring elements are strictly mutually parallel with respect to each other. This means that a channel crossing and intersecting the central axis 16 of the mounting extends radially, whereas the other channels extends parallel to that central channel and from secants with respect to a radial plane of the mounting. It is not very significant for the principle of the present invention, whether the channel 12' extending at the outer edge of the ring-shaped elastomer spring element is sectioned, completely closed or completely open, as can be seen in the single FIGURE. Such a constructive configuration can be selected by a person skilled in the art according to the special application.

The ring-shaped elastomer spring elements 5,6 on the upper and the lower side of the external flange 7 of the beaker-type housing part 2 are shaped identically.

As known per se and not illustrated in the single FIGURE, the support spring block 3 is an elastomer spring block interspersed with groups of mutually parallel channels, said groups crossing each other in different radial planes without intersecting, said channels intersecting spherical cavities arranged regularly. Such a support spring block comprises a high mechanical rigidity combined with a wide-range soft linear characteristic curve.

While this invention has been illustrated and described in accordance with a preferred embodiment, it is recognized that variations and changes may be made and equivalents employed herein without departing from the invention as set forth in the claims.

What is claimed is:

1. A soft mounting for insulating body-transmitted acoustic waves, comprising:

a soft support spring block comprised of elastic material;

means for restricting and limiting the deflection path of the soft supporting spring block, said means comprising two beaker-type housing parts which are coaxially arranged with respect to each other and which are telescopingly inserted into one another in a radially spaced and mutually axially restrictive relationship, said soft support spring block being disposed between said two beaker-type housing parts whereby said two beaker-type housing parts serve to transfer load forces into said soft support spring block, each of said two beaker type housing parts including an end stop; and elastomer spring elements positioned adjacent said end stops, said elastomer spring elements including means for showing the effect of a collapse of a spring restoration force of said elastomer spring elements by kinking.

2. A soft mounting according to claim 1, wherein said two beaker-type housing parts comprise a first beaker-type housing part having an annular chamber which is open radially inward and a second beaker-type housing part having an external flange, said external flange protruding into said chamber in a radially and axially spaced relationship.

3. A soft mounting according to claim 2, wherein said elastomer spring elements comprise a first elastomer spring element positioned on an upper side of the external flange facing said first beaker-type housing part and a second elastomer spring element positioned on a lower side of the external flange.

4. A soft mounting according to claim 2, wherein the elastomer spring elements and said support spring block are arranged coaxially, said elastomer spring elements surrounding said support spring block in a ring-shaped manner whereby the radial distance between the elastomer spring elements and the support spring block is large enough that the spring elements and the support spring block do not contact each other even when they are subjected to a maximum deflection caused by an external load.

5. A soft mounting in accordance with claim 1, wherein the elastomer spring elements and said support spring block are arranged coaxially, said elastomer spring elements surrounding said support spring block in a ring-shaped manner whereby the radial distance between the elastomer spring elements and the support spring block is large enough that the spring elements and the support spring block do not contact each other even when they are subjected to a maximum deflection caused by an external load.

6. A soft mounting according to claim 1, wherein said means for showing the effect of a collapse of the spring restoration force by kinking includes channels interspersed in a mutually parallel manner within said elastomer spring elements, said channels being open on both sides and lying in the same radial plane, said channels having a cross-section which is formed in such a way that walls of said channels show the effect of a collapse by kinking once the load acting thereon surpasses a certain predetermined critical value.

7. A soft mounting according to claim 6, wherein said channels are coaxial.

8. A soft mounting according to claim 6, wherein the cross-section of the channels formed in the elastomer spring elements are alternately shaped as an upright standing rhomb and an upright standing double trapezoidal hexagon whose smaller base is positioned inside the channel.

9. A soft mounting according to claim 8, wherein when there is no load acting on the mounting, said support spring block is prestressed against the direction of a predetermined load so that when the predetermined load is acting statically, the elastomer spring elements are positioned opposite the adjacent end stop and spaced from said end stop by a predetermined distance.

10. A soft mounting according to claim 9, wherein the support spring block is an elastomer spring block interspersed with groups of mutually parallel channels, said groups crossing each other in different radial planes without intersecting, said channels in said support spring block intersecting spherical cavities arranged within said support spring block.

11. A soft mounting according to claim 1, wherein each of said elastomer spring elements comprises a single circularly closed elastomer spring element.

12. A soft mounting according to claim 1, wherein each of said elastomer spring elements comprises a plurality of separate elastomer spring elements arranged in a ring-shaped manner.

13. A soft mounting according to claim 1, wherein, when there is no load acting on the mounting, said support spring block is prestressed against the direction of a predetermined load so that when the predetermined load is acting statically, the elastomer spring elements are positioned opposite the adjacent end stop and spaced from said end stop by a predetermined distance.

14. A soft mounting according to claim 1, wherein the support spring block is an elastomer spring block interspersed with groups of mutually parallel channels, said groups crossing each other in different radial planes without intersecting, said channels in said support spring block intersecting spherical cavities arranged within said support spring block.

15. A soft mounting according to claim 1, wherein said means for showing the effect of a collapse of a spring restoration force by kinking is positioned within said elastomer spring elements.

* * * * *